Aug. 20, 1940.
A. HENDERSON
2,212,421
ASSEMBLY TABLE
Filed April 3, 1937
3 Sheets-Sheet 1
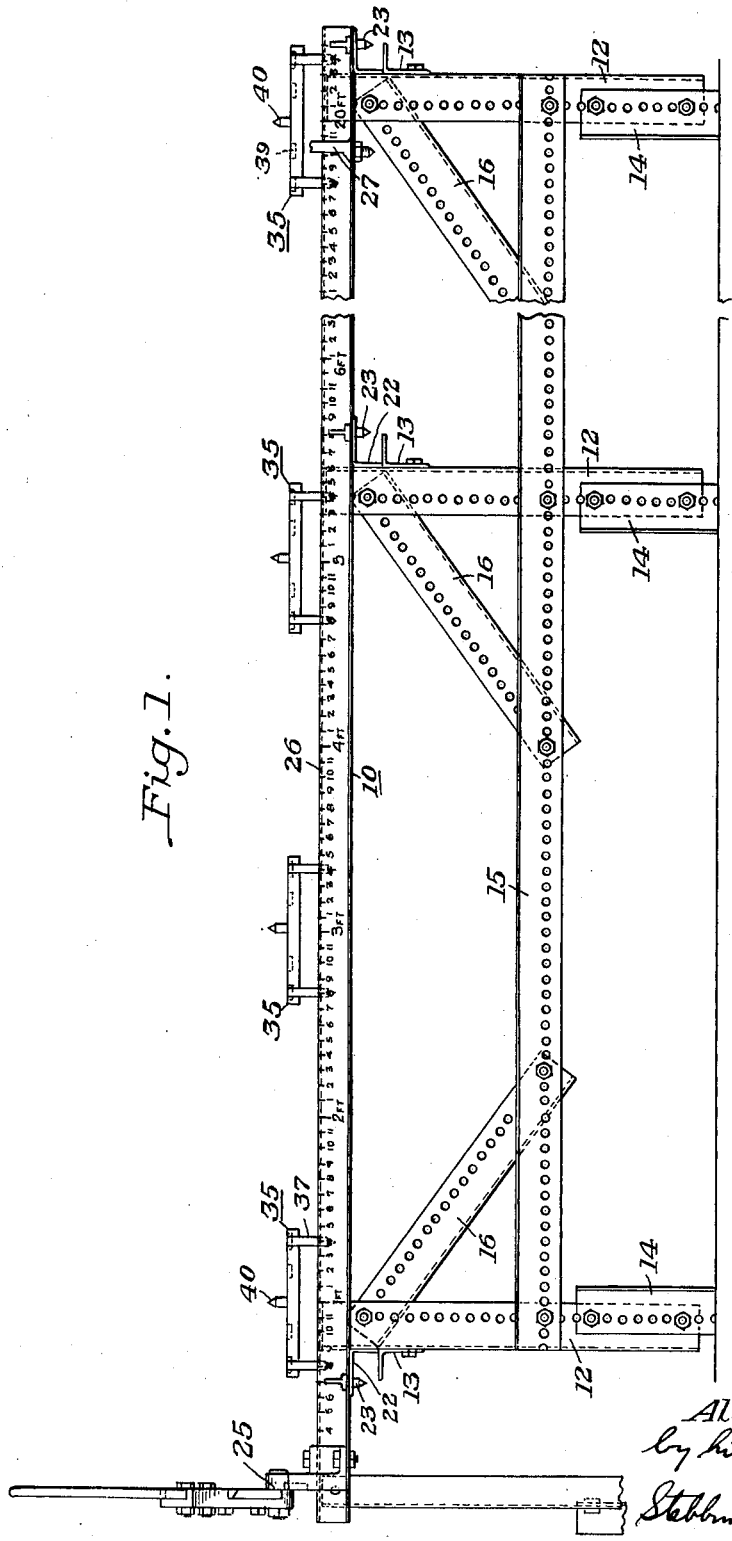
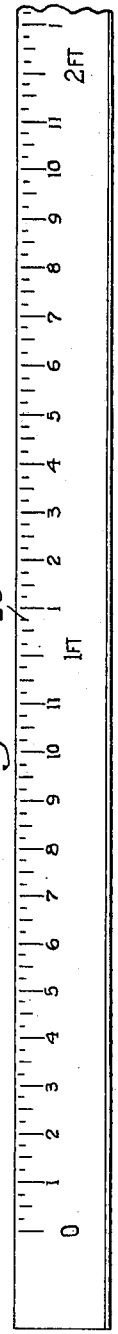
INVENTOR
Albert Henderson
by his attorneys
Stebbins, Blenko & Parmelee Aug. 20, 1940.   A. HENDERSON   2,212,421
ASSEMBLY TABLE
Filed April 3, 1937   3 Sheets-Sheet 2
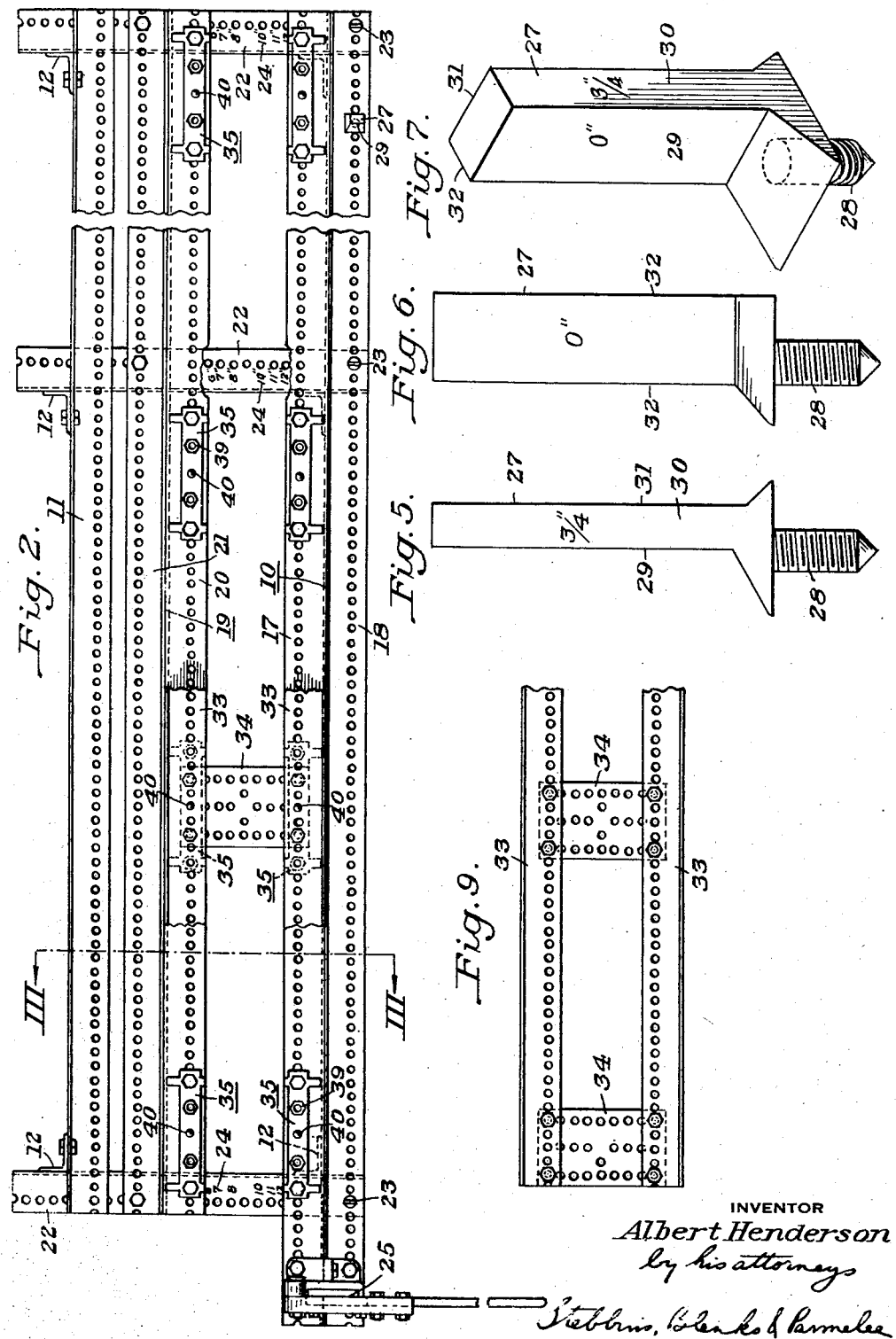
INVENTOR
Albert Henderson
by his attorneys Aug. 20, 1940.  A. HENDERSON  2,212,421
ASSEMBLY TABLE
Filed April 3, 1937  3 Sheets-Sheet 3
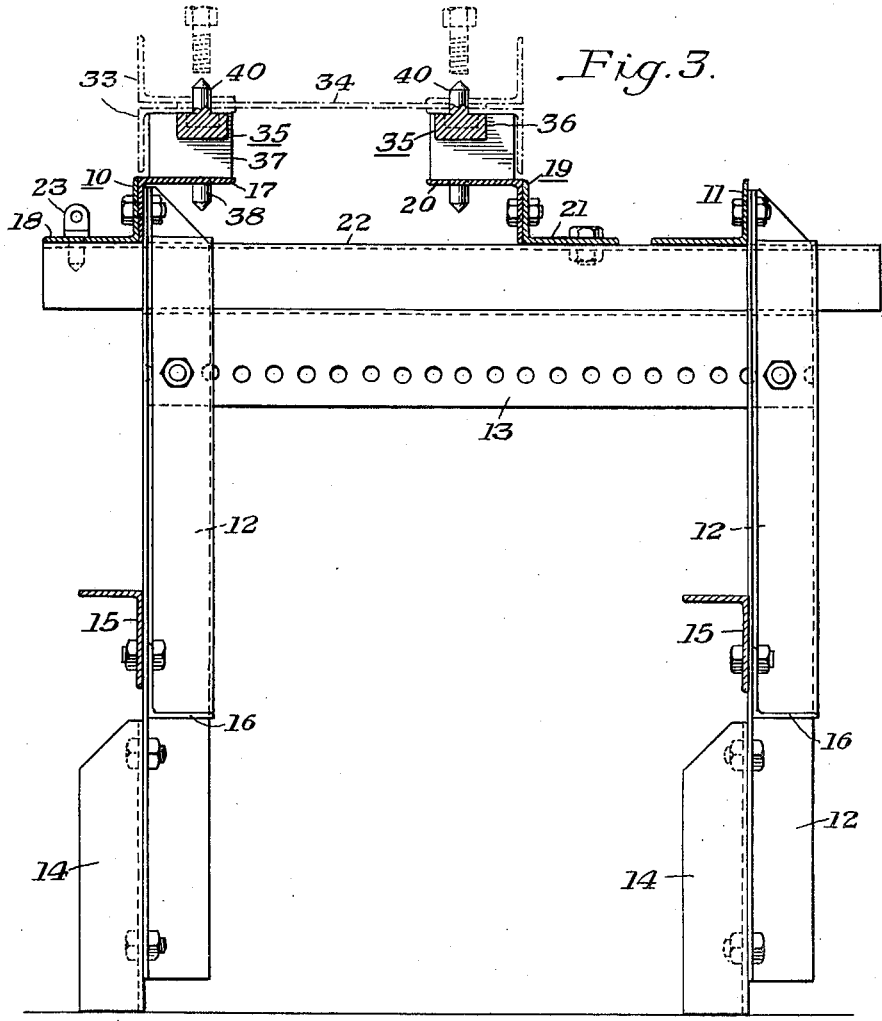
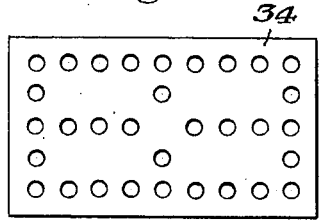
INVENTOR
Albert Henderson
by his attorneys
Stebbins, Blenko & Parmelee Patented Aug. 20, 1940

2,212,421

UNITED STATES PATENT OFFICE 2,212,421

ASSEMBLY TABLE

Albert Henderson, Edgewood Borough, Pa., assignor to William P. Witherow, Pittsburgh, Pa.

Application April 3, 1937, Serial No. 134,827

4 Claims. (Cl. 29—89)

This invention relates to assembling apparatus and particularly to a table for the assembly of composite structural members comprising spaced parallel angles each having a perforated flange, connected by spaced web plates. Such a member is described and claimed in my United States Patent No. 2,114,901.

Experience has shown that the assembly of such members on the ordinary work bench is a matter requiring considerable skill and patience. It is the object of this invention, therefore, to provide an apparatus which will facilitate the assembly of such members and make it possible for this work to be done by unskilled labor at relatively low cost per unit.

In accordance with the invention, I provide parallel rails one of which is preferably adjustable to and from the other, with templets adapted to be positioned at intervals therealong having means for receiving the angles and web plates composing the members, and passing through the hole therein. The templets also have recesses for receiving and holding nuts in alinement with the holes in the angles and plates so that it is a relatively simple matter to insert bolts through said holes and turn them home tight. The parallel rails are preferably constituted by perforated angles similar to those employed in assembling the composite members. The templets have pins adapted to enter the holes in the angles whereby the former may be positioned at a plurality of locations along the latter. I also incorporate in the assembly table, means for shearing the angles used in assembling the members, to precisely the desired length.

For a complete understanding of the invention, reference is made to the following detailed description which is to be read in connection with the accompanying drawings illustrating a present preferred embodiment. In the drawings, Figure 1 is a side elevation;

Figure 2 is a plan view;

Figure 3 is a sectional view taken along the line III—III of Figure 2;

Figure 4 is a perspective view of one of the templets;

Figure 5 is an end elevation of a gage block;

Figure 6 is a side elevation thereof;

Figure 7 is a perspective view;

Figure 8 is an enlarged view of a scale incorporated in the assembly table for convenience in shearing angles to the proper length;

Figure 9 is an elevation of a composite structural member such as described and claimed in my patent aforementioned; and Figure 10 is a plan view of one of the web plates incorporated in the member of Figure 9.

As shown in the drawings, the assembly table of my invention comprises longitudinal rails 10 and 11, supported on legs 12 connected by cross bars 13. The legs 12 are supported on adjustable feet 14 and are connected by longitudinal braces 15. Angle braces 16 connect the longitudinal braces 15 and the legs 12. It will be observed that all the members mentioned above are composed of appropriate lengths of angle sections having a row of holes adjacent the edge of the longer leg, the holes being spaced from each other by the distance between the center line of the row of holes and the edge of the angle flange or leg. By reason of this construction, the table itself can be cheaply and quickly made without the necessity of expensive layouts and detailing. The unperforated leg of the angles, of course, is punched where necessary to provide bolt holes. The rail 10 is composed of a pair of angles 17 and 18 bolted together and to the legs 12, in the form of a Z-bar. A similar parallel rail 19 is composed of angles 20 and 21. The rail 19 is bolted to cross angles 22 slidably supported on the cross bars 13.

By reason of the construction described, the rail 19 may be moved to and from the rail 10. It may be secured in any desired position relative thereto by pins 23. These pins are inserted through the holes in the horizontal flange or cross members 22 which are alined therewith when the rail 19 has been properly positioned with respect to the rail 10. The holes in the cross members 22 may conveniently be graduated as indicated at 24 to indicate the distance between the vertical legs of the angles 17 and 20.

The left end of the rail 10 overhangs the end of the table as shown in Figures 1 and 2 and supports a shear 25 which serves as a convenient means for cutting angles such as those of which the members of the table are composed to the desired length before assembling them into beams or the like in the manner to be described later. To this end, the vertical leg of the angle 18 is provided with a graduated scale 26. A gage block 27 is adapted to be disposed at a selected point along the angle 18 and is provided with a stud 28 adapted to be inserted in any one of the holes in said angle. The gage block may be clamped in any desired position by threading a nut on the stud 28 as shown in Figure 1.

The gage block 27 has a plurality of faces as best shown in Figures 5, 6 and 7. The holes in the angles which I prefer to employ for assembling composite members are spaced on one inch centers. The holes in the angles composing the assembly table are similarly spaced. As shown in Figure 1, the cutting edges of the shear 25 are located at the zero mark of the scale 26. This mark, as well as the other graduations of the scale, are in alinement with the holes in the angle 18. The several faces of the gage block 27 are indicated at 29, 30, 31 and 32. As shown in Figure 5, the face 29 is in line with the center line of the stud 28. When the gage block is positioned in any of the holes in the angle 18, therefore, and an angle abutted thereagainst and sheared off, it will be cut to the desired length in feet and even inches. If it is desired to shear a length to a length of so many feet, inches and fractions thereof, the appropriate faces of the gage block are turned toward the shear. The face 30 provides for shearing to ¾ inch, the face 31 to ½ inch and the face 32 to ¼ inch. When the angles have been sheared to the proper length they are ready to be assembled to form beams or other structural members as illustrated in Figure 9, the angles indicated at 33 being connected by web plates 34 spaced at intervals therealong. Figure 10 shows the web plate to enlarged scale.

To facilitate assembly of members such as shown in Figure 9, I provide templets 35. These templets are simply blocks 36 having legs 37 adjacent their ends. The legs have depending pins 38 adapted to enter the holes in the angles 17 and 20. The blocks 36 have nut or bolt head receiving recesses 39 and guide pins 40 adapted to enter the holes in the angles 33 and plates 34 disposed over the templets.

These recesses 39 in the blocks or templets 35 form socket wrenches to prevent the turning of either the bolt head or nut when seated therein when the nut is screwed onto the bolt during the securing of web plates to angles, and as the centers of the recesses 39 are in vertical alignment with holes in the rails 17 and 20, the bolt heads or nuts seated therein will match up with holes in the parts to be assembled, see Fig. 2.

The first operation is the setting of the rail 19 to the proper distance from the rail 10 in the manner already explained. Templets 35 are then disposed as shown in Figure 2 at the points along the rails at which web plates are to be secured to the angles 33. Since the holes in the angles 17 and 20 have the same spacing as those in the angles 33, the templets will be properly positioned merely by inserting the pins 38 in the holes in the angles 17 and 20 at the desired points. The next step is the insertion of nuts in the recesses 39 of the templets. If the structural member to be assembled is of I section, as indicated by dotted lines in Figure 3, angles 33 are first laid on the templets with their unperforated flanges depending. The guide pins 40, of course, pass through the holes in the perforated leg of the angles 33 and hold the angles in proper spaced relation. Web plates 34 are then laid over the angles 33 on the templets as indicated in Figure 2. Additional angles are then laid over the plates with their unperforated legs upstanding. The angles and web plates may then be secured together by threading bolts through the nuts in the recesses 39. The bolts may be turned home quickly by any suitable tool, the nuts being held against rotation by the conformation of the recesses 39. When the nuts have been turned home, the complete member as shown in Figure 9 may be lifted off the templets and the assembling process repeated. If a channel section is to be assembled, the procedure is similar except that the angles on one side of the web plates are omitted.

If it is desired to assemble a different size of structural member, it is only necessary to remove the pins 23 and adjust the rail 19 to the proper position relative to the rail 10. Similarly, if the spacing of the web plates is to be changed, the templets 35 may readily be shifted to the new positions simply by lifting them from the angles 17 and 20 and replacing the pins 38 in the proper holes.

It will be apparent from the foregoing description that the invention provides a simple and inexpensive means by which the assembly of composite structural members may be greatly facilitated and expedited. By using angles similar to those forming completed structural members in the construction of the assembly table, the templets are always maintained in alinement with the holes in the angles to be assembled. The apparatus is so constructed that various sizes and types of members may be assembled and the adjustment of the table to accommodate different sizes is extremely simple. The shear incorporated in the assembly table permits the angles to be accurately cut to the desired length, even to the fraction of an inch, after they are laid on the table for assembly into beams and the like.

Although I have illustrated and described herein but a single preferred embodiment of the invention, changes in the construction disclosed may be made without departing from the scope of the invention or the appended claims.

I claim:

1. Apparatus for assembling composite structural members of various sizes of structural elements, each structural element having securing bolt-receiving openings spaced apart a multiple of a predetermined unit of measurement, comprising a pair of element-supporting rails, each having a row of openings spaced apart a distance equal to said predetermined unit of measurement of the spacing of the openings in the structural elements, templets adapted to be selectively placed at different positions along said rails, said templets each having pins extending downwardly adapted for engagement with holes in the rails to retain the templets in fixed positions, an upwardly extending pin on each of the templets, the downwardly extending pins and the upwardly extending pins on the templets being so spaced longitudinally therealong that when the downwardly extending pins on the templets are engaged in openings in the rails, the distance between said upwardly extending pins of adjacent templets is a multiple of the predetermined unit of measurement of the bolt-opening spacing in the structural elements.

2. Apparatus for assembling different structural units of various sizes of structural elements, each having a row of openings spaced apart a predetermined unit of measurement, comprising a pair of supporting rails, each having a row of openings matching the openings in the structural units, and templets adapted to be placed at different positions along the rails having downwardly extending pins adapted for engagement with the holes in the rails and to retain the templets in fixed adjusted positions and an upwardly extending pin on each templet for engagement with holes in the structural elements for positioning said elements relative to each other for securing them to each other, said templets having socket wrench seats spaced along the top and so spaced as to align with openings in the elements when centered on the upwardly extending pins.

3. Apparatus for assembling composite structural members of various sizes of structural elements, each structural element having securing bolt-receiving openings spaced apart a multiple of a predetermined unit of measurement, comprising a pair of element-supporting rails, each having a row of openings spaced apart a distance equal to said predetermined unit of measurement of the spacing of the openings in the structural elements, templets adapted to be selectively placed at different positions along said rails, said templets each having pins extending downwardly adapted for engagement with holes in the rails to retain the templets in fixed positions, an upwardly extending pin on each of the templets, the downwardly extending pins and the upwardly extending pins on the templets being so spaced longitudinally therealong that when the downwardly extending pins on the templets are engaged in openings in the rails, the distance between said upwardly extending pins of adjacent templets is a multiple of the predetermined unit of measurement of the bolt-opening spacing in the structural elements, transverse guides connected to one of said rails whereby said rail may be moved relative to the other rail, and means for holding said guides in a selected position.

4. Apparatus for assembling composite structural members of various sizes of structural elements, each structural element having securing bolt-receiving openings spaced apart a multiple of a predetermined unit of measurement, comprising a pair of element-supporting rails, each having a row of openings spaced apart a distance equal to said predetermined unit of measurement of the spacing of the openings in the structural elements, templets adapted to be selectively placed at different positions along said rails, said templets each having pins extending downwardly adapted for engagement with holes in the rails to retain the templets in fixed positions, an upwardly extending pin on each of the templets, the downwardly extending pins and the upwardly extending pins on the templets being so spaced longitudinally therealong that when the downwardly extending pins on the templets are engaged in openings in the rails, the distance between said upwardly extending pins of adjacent templets is a multiple of the predetermined unit of measurement of the bolt-opening spacing in the structural elements, transverse guides connected to one of said rails, whereby said rail may be moved relative to the other rail, said guides, each having a row of openings in alignment with an opening in a fixed portion of the apparatus, said openings in the guides being spaced apart a distance equal to said predetermined unit of measurement of the spacing of the openings in the structural elements, and removable pins for passing through the registering openings in the guides and the openings in the fixed portion of the apparatus for fixedly securing said movable rail.

ALBERT HENDERSON.